(12) United States Patent
Greenwood

(10) Patent No.: US 6,866,594 B2
(45) Date of Patent: Mar. 15, 2005

(54) POLO TRAINING APPARATUS

(76) Inventor: William Ronald Greenwood, The Mount, Park Road, Tarporley, Cheshire CW 6 01N (GB)

(*) Notice: Subject to any disclaimer, the term of this patent is extended or adjusted under 35 U.S.C. 154(b) by 49 days.

(21) Appl. No.: 09/896,859

(22) Filed: Jun. 29, 2001

(65) Prior Publication Data
US 2002/0014741 A1 Feb. 7, 2002

(30) Foreign Application Priority Data
Jun. 29, 2000 (GB) .................................... 0015815

(51) Int. Cl.⁷ .......................... A63B 69/00; G09B 19/00
(52) U.S. Cl. ...................... 473/422; 434/247; 472/101; 472/92
(58) Field of Search ................................ 273/370, 358, 273/359, 368, 369, 407, 317, 352, 110 R, 126 R; 434/247, 225, FOR 247; 446/29, FOR 29; 472/FOR 95–97, 99, 101, 34, FOR 99, FOR 101, FOR 34; 463/1, 6, 60, 68, 69, 47.6, 33, 36

(56) References Cited

U.S. PATENT DOCUMENTS

| | | | | |
|---|---|---|---|---|
| 1,207,023 A | * | 12/1916 | Grellner | 472/96 |
| 1,716,235 A | * | 6/1929 | Manning | 463/60 |
| 2,121,377 A | * | 6/1938 | Whitehouse | 273/370 |
| 2,169,663 A | * | 8/1939 | Shanley | 446/279 |
| 2,622,878 A | * | 12/1952 | Mooney | 472/105 |
| 2,882,051 A | * | 4/1959 | Lee | 472/97 |
| 3,112,929 A | * | 12/1963 | Gisser | 273/441 |
| 3,324,832 A | * | 6/1967 | McCain | 273/369 |
| 3,406,969 A | * | 10/1968 | Tisdell et al. | 434/225 |
| 3,730,524 A | * | 5/1973 | Green | 472/101 |
| 4,575,072 A | * | 3/1986 | Russell | 472/104 |
| 4,713,010 A | * | 12/1987 | Veillas | 434/247 |
| 4,767,117 A | * | 8/1988 | Maio | 472/29 |
| 4,957,444 A | * | 9/1990 | Armen | 434/247 |
| 4,988,300 A | * | 1/1991 | Yamaguchi et al. | 434/247 |
| 5,180,338 A | * | 1/1993 | Pinto | 472/101 |
| 5,429,515 A | * | 7/1995 | Greenwood | 434/247 |
| 6,093,109 A | * | 7/2000 | Eden et al. | 472/90 |

FOREIGN PATENT DOCUMENTS

| | | | | |
|---|---|---|---|---|
| DE | 2817771 | * | 10/1979 | |
| DE | 37 04 150 A1 | * | 8/1988 | |
| DE | 19912281 A1 | * | 10/2000 | .......... A63B/69/04 |
| DE | 10045676 A1 | * | 4/2002 | .......... A61H/1/00 |
| FR | 2670127 | * | 1/1991 | |
| GB | 2233913 | * | 6/1992 | |
| JP | 405076658 | * | 3/1993 | |
| WO | WO 9214520 A1 | * | 9/1992 | .......... A63B/69/04 |

* cited by examiner

Primary Examiner—Gregory Vidovich
Assistant Examiner—Mitra Aryanpour
(74) Attorney, Agent, or Firm—D'Ambrosio & Associates, P.L.L.C.

(57) ABSTRACT

A polo training apparatus comprises a dummy horse and conveyor belts arranged one each side of the dummy horse. A ball located on one of the conveyor belts will be displaced relative to the dummy horse, thereby simulating the movement of the horse relative to the ground and the ball. The dummy horse may also be movable to simulate the movement of a horse and the speed of movement of the dummy horse may be linked to the speed of the conveyor belts to simulate the riding of a horse more closely.

22 Claims, 5 Drawing Sheets

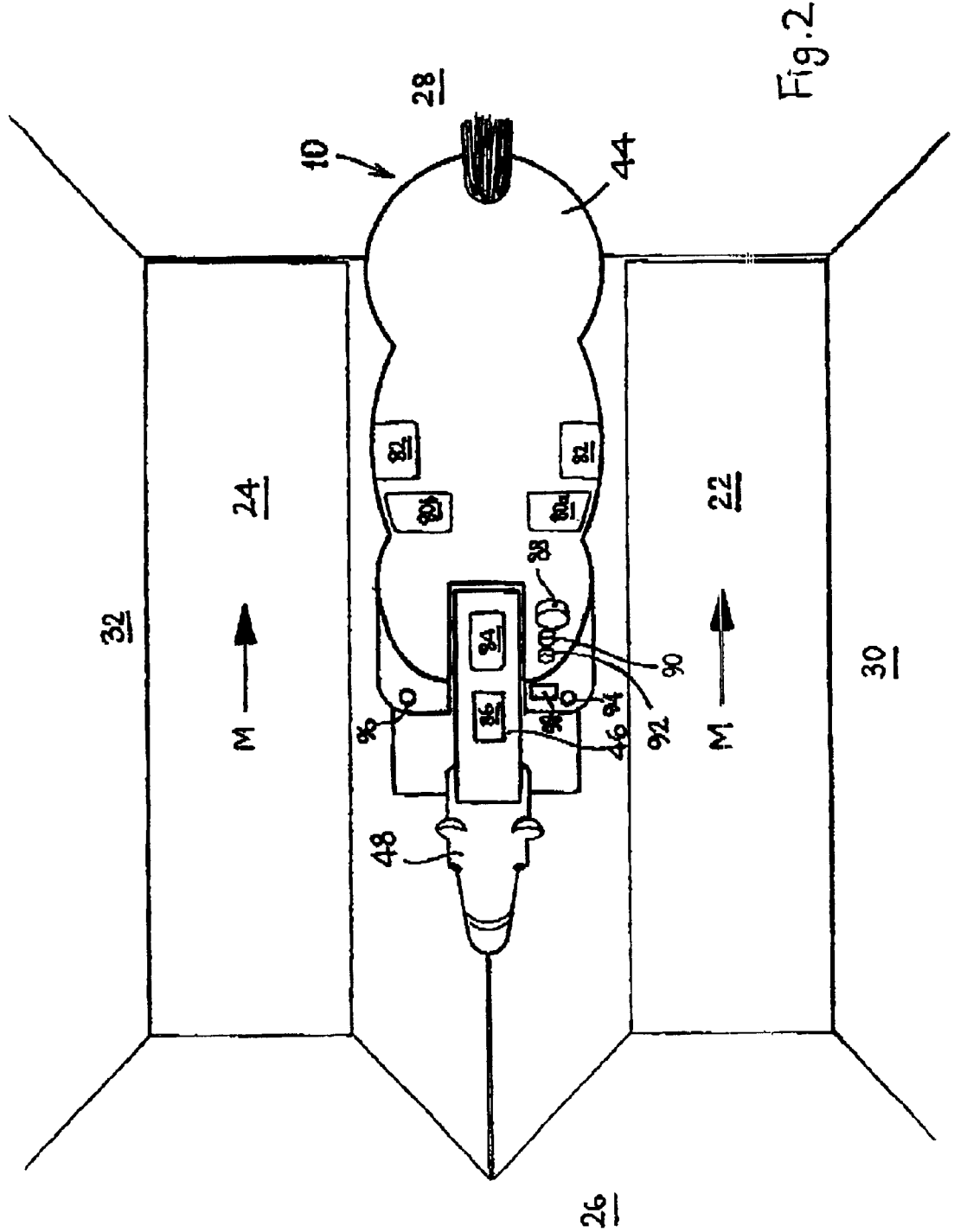

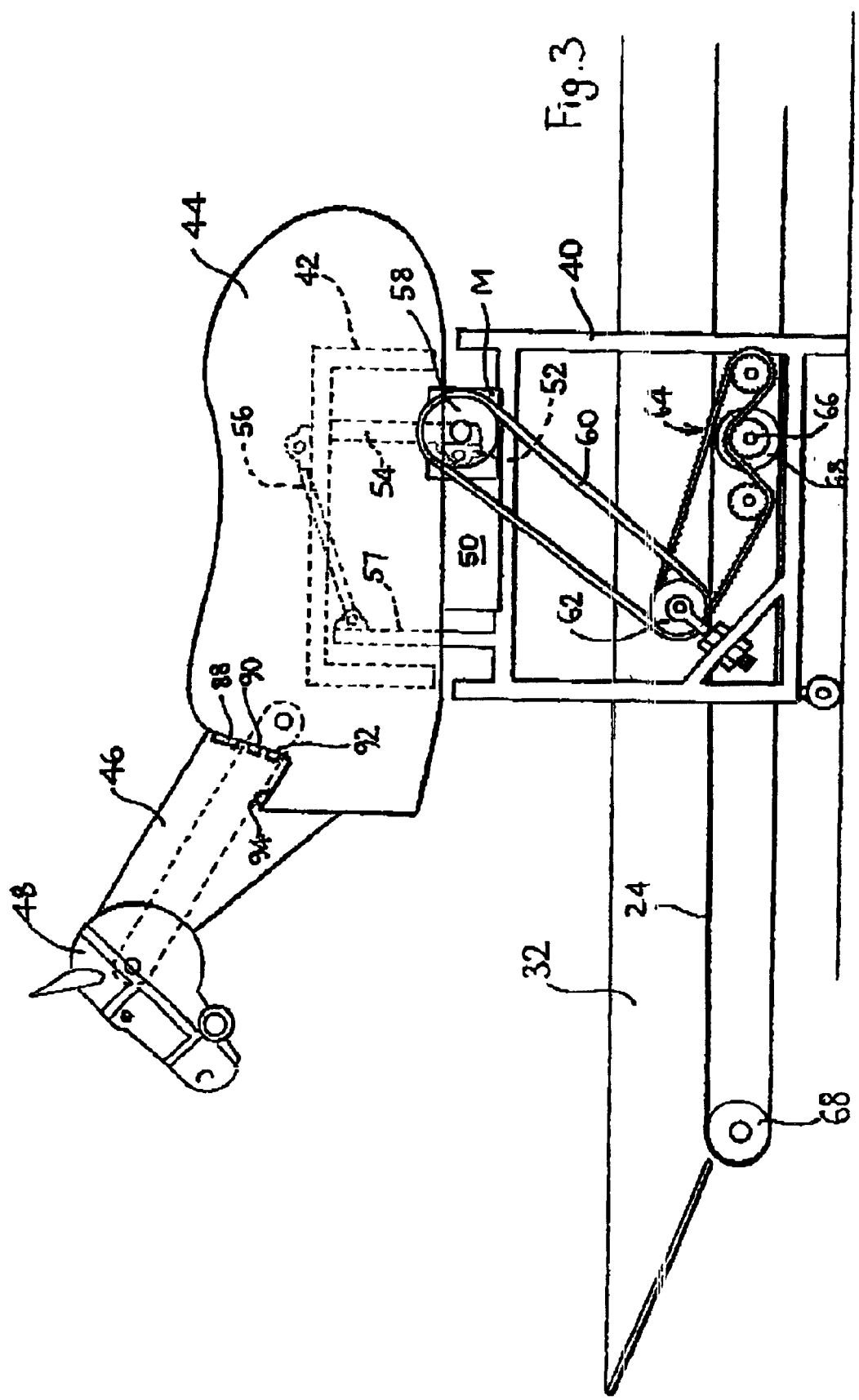

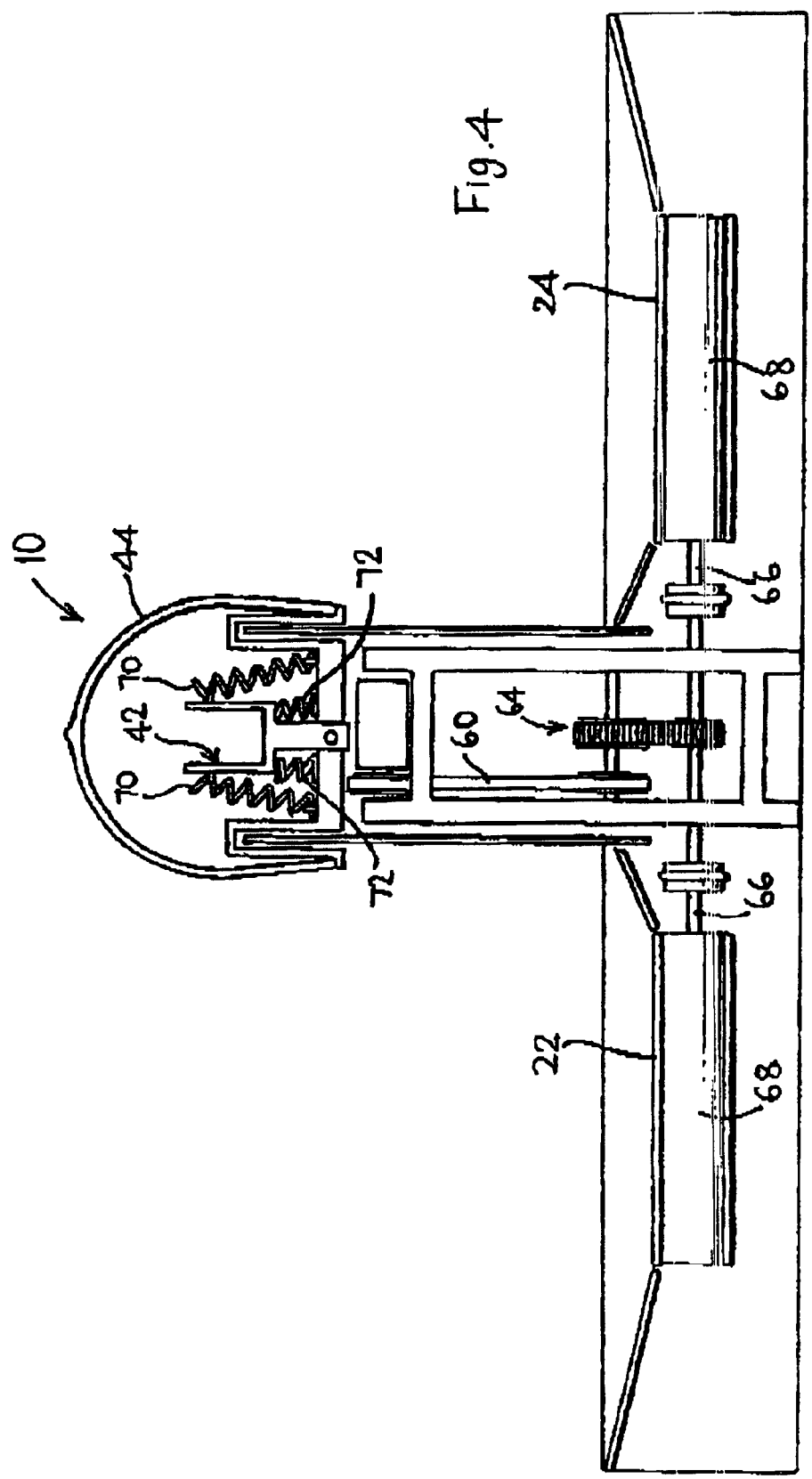

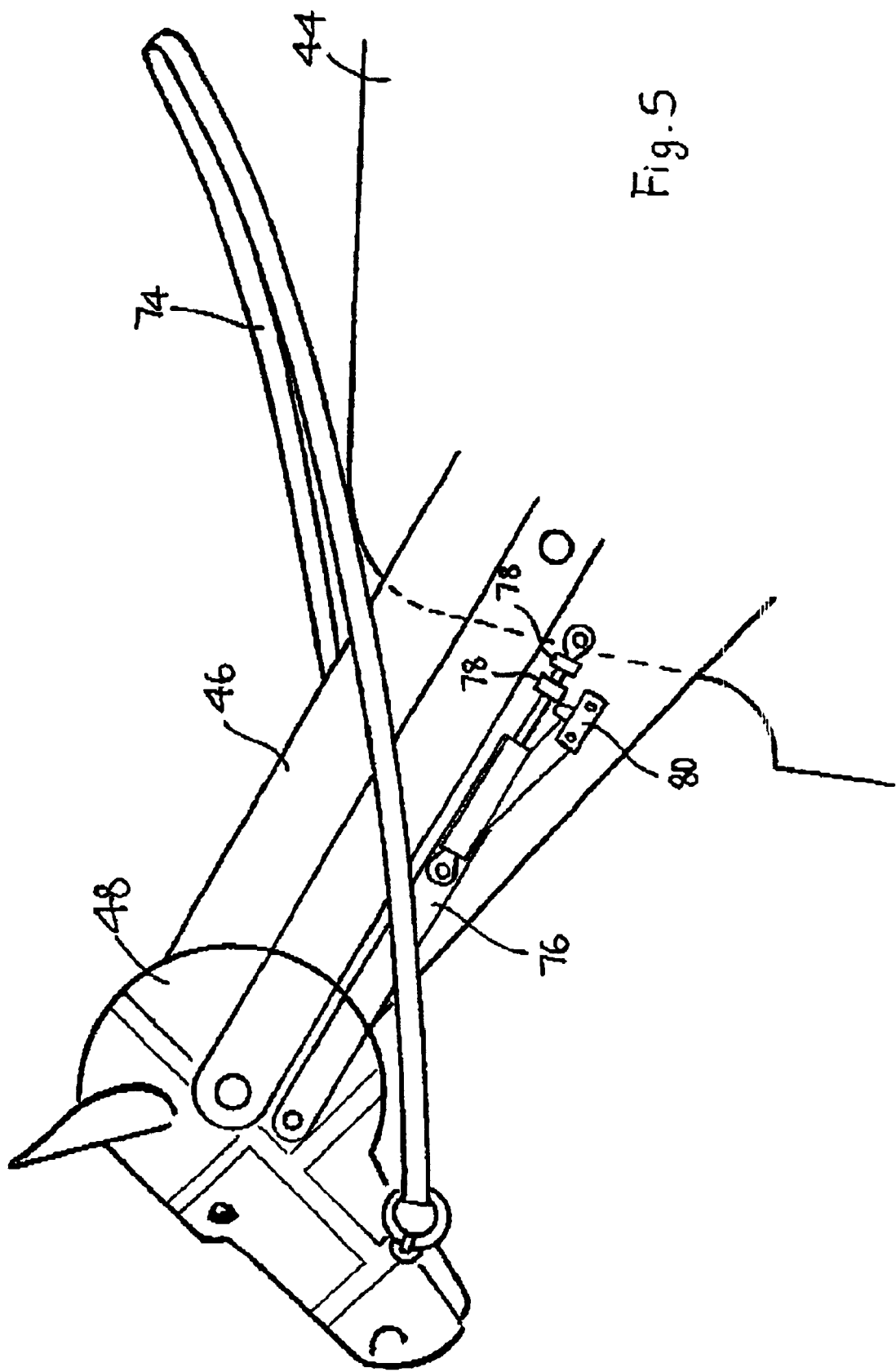

POLO TRAINING APPARATUS

At present, the opportunities for practicing polo other than a polo match are limited. One option is for a player to ride a polo pony and to hit a series of balls across a field. Whilst such practice is very effective, it is a relatively expensive option and requires the use of a large area. Moreover, there is a problem with position the practice balls and in retrieving them once they have been hit.

The second option is for a player to sit astride a dummy horse and to hit a series of balls located on the floor. Whilst this can be done in a much smaller area, the fact that the dummy horse is stationary means that relatively few balls can be lined up ready to be hit. Moreover, the practice which this option affords is not particularly realistic.

It is an object of the present invention to provide a polo training apparatus which overcomes or alleviates the problems associated with the prior art.

In accordance with a first aspect of the present invention, a polo training apparatus comprises a dummy horse and at least one ball-locating surface located adjacent to and below the dummy horse, the ball-receiving surface being displaceable relative to the dummy horse.

Preferably, the or each ball-receiving surface is located to one side of the dummy horse and preferably is arranged to move in a direction parallel to the fore/aft direction of the dummy horse.

In this way, a ball located on the ball-receiving surface will be displaced relative to the dummy horse, thereby simulating the movement of the horse relative to the ground and to the ball.

Preferably, the apparatus comprises a plurality of displaceable ball-receiving surfaces.

In a preferred embodiment, a ball-receiving surface is provided on each side of the dummy horse.

Preferably, the or each movable surface comprises an endless conveyor belt.

In one preferred embodiment, the dummy horse is itself displaceable, e.g. reciprocable, preferably to simulate the action of a moving horse. Preferably, the speed of the horse is linked to the speed of the or each ball-receiving surface, whereby an increase in the speed of one increases the speed of the other. In this way, a very realistic action can be achieved in which the induced motion of the dummy horse corresponds with an increased speed of the ball-receiving surface.

Preferably, the dummy horse and the or each moving surface are displaced by the same means, e.g. an electric motor.

The apparatus may further comprise one or more inclined surfaces adjacent to the or each moving surface, whereby a ball which has been hit off the moving surface is encouraged to return to the surface, where it can be hit again. The apparatus may further comprise a peripheral enclosure, e.g. a cage or net, to prevent balls from inadvertently being hit out of the apparatus.

In accordance with a second aspect of the present invention, a polo training apparatus comprises a dummy horse having a substantially rigid frame and a body portion pivotally mounted on the frame, whereby the body portion can be pivoted from side to side.

The side to side pivoting of the body portion of the dummy horse simulates more closely the movement of a rider and horse as a ball is hit.

Preferably, the body portion is biased (e.g. by means of springs) whereby the body portion can be displaced to either side against a restoring force. In one embodiment, the apparatus further comprises a sensor adapted to detect pressure from one or more parts of the rider's body. For example, the apparatus may comprise a sensor to detect pressure applied by one or both knees or feet of the rider. There may also be display means, e.g. a light, which indicates to a rider when correct pressure is applied, and therefore the correct posture is assumed, for a particular shot.

In accordance with a third aspect of the present invention, a horse riding training apparatus comprises a movable body portion upon which a rider sits and means for displacing the body portion, the apparatus further comprising sensor means responsive to a simulated riding action in order to control the apparatus.

In one embodiment, the apparatus comprises pressure sensors adapted to respond to pressure from a particular part of the rider's body, for example the rider's feet, knees or hand. In this way, the apparatus can be arranged such that application of a sharp pressure to sensors on either side of the body results in commencement of the movement of the body portion and further application of pressure to those areas causes an increase in the speed of movement of the body portion.

In one embodiment the apparatus further comprises a simulated horse head portion, reins extending from the horse head portion and a control means actuated by movement of the head with the reins.

For example, movement of the head may be arranged to actuate a switch which causes the motion of the horse to slow or stop.

By way of example only, a specific embodiment of the present invention will now be described, with reference to the accompanying drawings, in which:

FIG. 2 is a plan view of a portion of the apparatus illustrated in FIG. 1;

FIG. 3 is a side view, partly cut-away, of a portion of the apparatus of FIG. 1;

FIG. 4 is a transverse cross-section through a portion of the apparatus shown in FIG. 1; and FIG. 5 is a side view, partly cut-away, of a head portion of the apparatus shown in FIG. 1.

Figure 1:
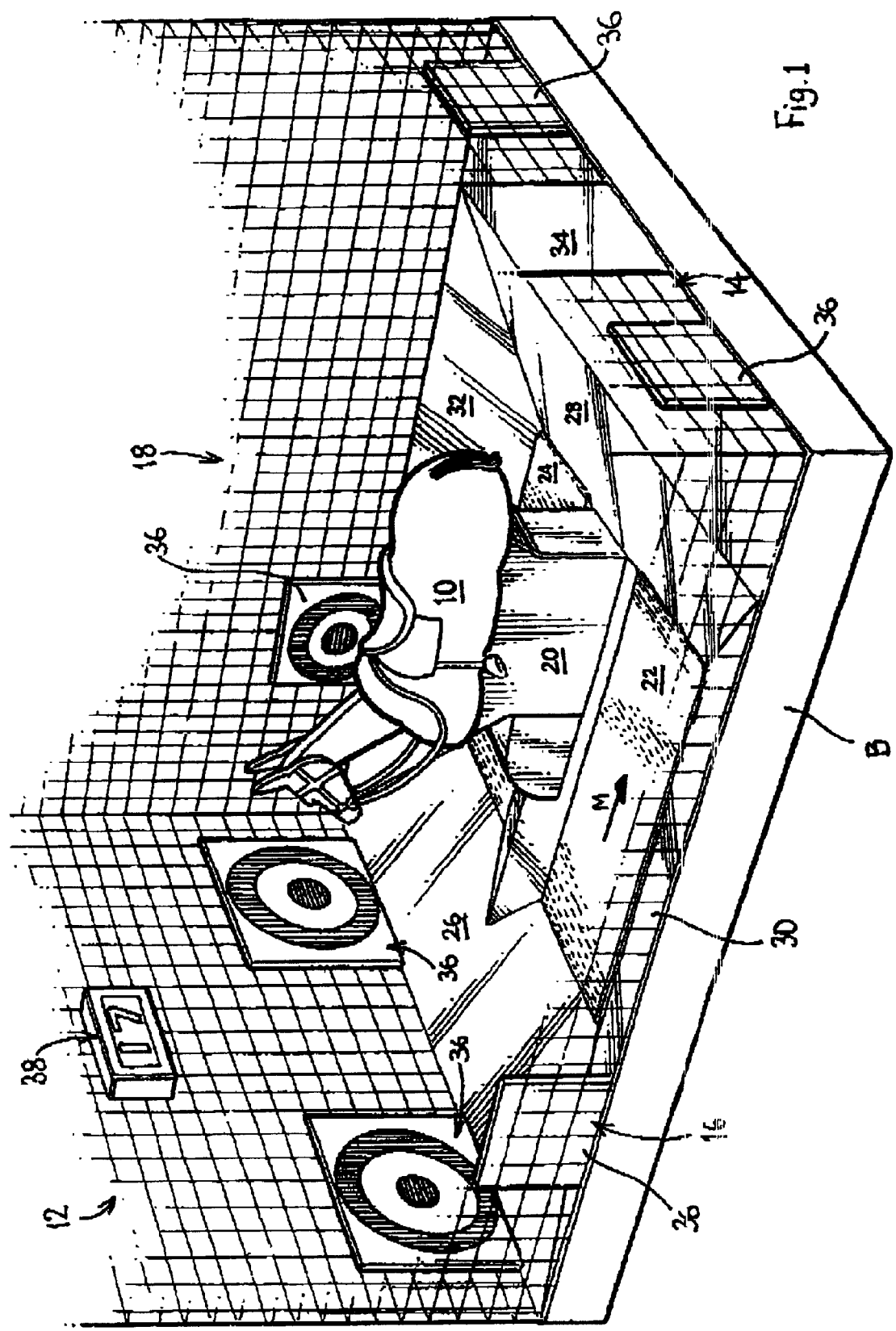
FIG. 1 is a perspective view, partly cut-away, of an embodiment of polo training apparatus in accordance with the present invention.

Referring firstly to FIG. 1, a polo training apparatus comprises a simulated polo pony 10 (hereinafter referred to as a "dummy horse") located on a base B within and enclosure defined by two end walls 12, 14 and two side walls 16, 18, all of netting or wire mesh. The dummy horse 10 is mounted on a frame 40 (FIG. 3) which is normally surrounded by enclosing walls 20. Conveyor belts 22, 24 are provided one on each side of, and below, the dummy horse, with the upper run of each conveyor generally horizontal and with the direction of motion of the conveyor belts being in the fore/aft direction of the dummy horse, as indicated by arrows M.

Immediately laterally outwardly of the conveyor belts 22, 24 are located upwardly inclined front, rear and side walls 26, 28, 30, 32. A generally horizontal wall 34 is also provided at the top of the rear inclined wall 32.

Two targets 36 are provided on the front wall 12, one to each side of the dummy horse 10. Similar targets 36 are provided on the rear wall 14 and one each on the side walls 16, 18. The targets comprise a pressure-sensitive area at their centre, which is actuated by the impact of a ball, generating a signal. A counter 38 is also provided on the front wall, to count the number of "hits" on the targets 36, as will be explained.

Referring to FIGS. 2 to 4, the dummy horse is supported on a fixed metal frame which is mounted on a fixed base wall B. As mentioned earlier, the fixed frame 40 is normally surrounded by enclosing walls 20, but these have been omitted from FIG. 3. A movable frame 42 is movably mounted on the fixed frame 40, as will be explained, and a simulated horse body 44 is mounted on the movable frame 42. A pivotally mounted neck portion 46 extends from the front of the body portion 44 and a pivotally mounted head 48 projects from the distal end of the neck portion 46. The head portion 48 is mounted to the neck portion such that the head pivots in the opposite direction to the neck portion, in the manner described in GB 2,256,597.

The frame 42 and the body portion 44 mounted thereon is displaceable with respect to the fixed frame 40 by means of a motor M mounted on the fixed frame portion. The operation of the motor is under the control of an electronic control unit 50. An eccentric drive 52 is mounted to the output of the motor M which in turn is connected to the movable frame portion 42 via a rigid arm 54 which is rigidly secured to the frame portion 42. A linking bar 56 extends between, and is pivotally mounted to, the moving portion 42 and an upwardly-projecting portion 57 of the fixed frame 40, whereby rotation of the motor M causes the body portion 44 to move cyclically in a motion which simulates that of a galloping horse.

The output of the motor 50 is also ted via a pulley 58, a drive belt 60, a pulley 62 and a further belt and pulley arrangement 64 to a drive shaft 66 to which are connected two rollers 68 around each of which a respective one of the two conveyors 22, 24 is entrained. Thus, operation of the motor M not only induces simulated a galloping motion in the horse but also causes the conveyor belts 22, 24 to move. Moreover, as the speed of the motor M is increased the speed of the galloping action increases and the speed of the conveyor belts increases accordingly.

With reference to FIG. 4, it will also be noted that the horse body portion 44 is pivotally mounted with respect to the movable frame 42 such that the body portion can pivot from side to side. The body portion is biased to a central position by means of restoring springs 70, 72 connecting the body portion 44 and the movable frame 42.

As best seen in FIG. 5, reins 74 extend from the head portion 48 of the horse, whereby the head portion can be pivoted downwardly with respect to the neck portion. A rod 76 extends between, and is pivotally mounted to, the head portion 48 and the neck portion 46 and is provided with two rings 78 which, as the head portion is pivotally mounted by means of the reins, actuates a microswitch 80 whose output is connected to the electronic control unit 50 and which is adapted to slow down or, optionally, stop the apparatus.

As seen in FIG. 2, the body portion 44 is also provided with two pressure sensitive knee sensors 80a, 80b, one on either side of the body, portion, two pressure sensitive feet sensors 82, one on either side of the body portion, and first and second pressure sensitive areas 84, 86 on the upper part of the neck portion 46, the outputs of these sensors being connected to the motor control unit 50. Manual controls, including an emergency stop switch 88, and faster/slower control buttons 90, 92, are also provided on one side of the body portion, their outputs also being connected to the motor control unit 50. The pressure sensitive panels and manual controls are arranged to control the apparatus, as will be explained. Indicator lights 94, 96 and an LCD speed display panel 98 are also provided on consoles at the front of the dummy horse.

In order to operate the apparatus the rider kicks the two feet sensors 82 simultaneously, which produces a signal causing the control apparatus 50 to start the motor M. Alternatively the faster control button 90 may be depressed or the upper sensor 86 on the neck portion may be pushed. Operation of the motor M induces a simulated galloping motion of the horse body and simultaneously operates the conveyor belts 22, 24, as described previously. Further simultaneous kicking of the feet sensors 82 (or depression of the faster control button 92 or pushing of the sensor 86) causes an increase in the speed of the motor M. When the motor M is rotating at the desired speed (as indicated by the LCD speed display panel 98), the rider, or an assistant, throws balls towards one or both of the conveyors 22,24, whereby they will be moved relative to the dummy horse (which is itself moving at a simulated gallop), allowing the rider to hit the balls in a manner similar to that experienced during a real polo match. Moreover, the motion of the horse more closely simulates a game of polo.

When it is desired to take a particular shot, one of the knee sensors 80a, 80b in combination with the lower sensor 84 on the neck portion 46 sense that the rider has assumed the correct posture for a particular shot and one of the indicator lights 94, 96 as appropriate (on the same side as the activated knee sensor 80a, 80b) illuminates in order to confirm this. By leaning to one side, the horse body 44 may be pivoted against the restoring force of the springs 70, 72, which again more closely simulates the action of a real polo pony.

The player then attempts to hit the ball and, if successful, hits one of the targets 36 which are provided with pressure sensors as described previously and which generate a signal whenever the sensor is hit. The counter 38 is arranged to keep a running total of "hits" on the targets.

If the ball is hit forwardly or to one side, it will rebound from the from or side wall 12, 16, 18 and move down the inclined walls 26, 30, 32 towards one of the conveyor belts 22, 24, where it becomes available for the rider to hit the ball again. This process is repeated until the balls collect at the junction at the rearmost portion of the conveyor belts and the rear inclined wall 34.

Thus, a rider may repeatedly hit a series of balls without having to dismount and without having to retrieve the balls once they have been hit. The simulated movement of the horse and the movement of the conveyors with respect to the horse also greatly enhance the realism, and therefore the effectiveness, of the practice. Moreover, by increasing the speed of the motor M the speed of the galloping motion of the dummy horse is increased correspondingly with the speed of the conveyor belts 22, 24, whereby as the dummy horse "gallops" more quickly, its speed relative to a ball on the conveyor also increases in a manner similar to that which would be experienced on a real horse.

When it is desired to slow down the apparatus, the rider pulls on the reins 74, causing actuation of the microswitch 80 which sends a signal to the motor control unit 50 which causes the motor M to slow down, thereby slowing the movement of the body portion 44 and the conveyors 22, 24. Repeated actuation of the microswitch in this manner eventually causes the apparatus to stop.

The invention is not restricted to the details of the foregoing embodiment.

What is claimed is:

1. A polo training apparatus comprising a dummy horse having a right side and a left side, two movable-surfaces for receiving a ball in play, one of said movable surfaces located adjacent to and below the right side of the dummy horse and the other of said movable surfaces located adjacent to and below the left side of the dummy horse, and an enclosure comprising four upwardly inclined walls, including a front wall, a back wall and two side walls, the walls positioned immediately, laterally and outwardly of the movable surfaces, the inclined surfaces angled to rise above the movable surfaces so as to return a hit ball to the movable surface, the enclosure further comprising a cage means positioned above the inclined walls.

2. A polo training apparatus as claimed in claim 1, wherein the moveable surfaces are displaceable in a direction substantially parallel to the fore/aft direction of the dummy horse.

3. A polo training apparatus as claimed in claim 1, wherein the moveable surfaces each comprises one run of an endless conveyor belt.

4. A polo training apparatus as claimed in claim 1, wherein the dummy horse is displaceable.

5. A polo training apparatus as claimed in claim 4, wherein the dummy horse is movable in a reciprocating motion.

6. A polo training apparatus as claimed in claim 4, wherein the dummy horse is movable to simulate the movements of a real polo horse during a game of polo.

7. A polo training apparatus as claimed in claim 4, wherein the speed of movement of the dummy horse is a function of the speed of the ball-receiving surface or vice versa.

8. A polo training apparatus as claim in claim 7, wherein the speed of the horse and the speed of the ball-receiving surface are directly proportional to one another.

9. A polo training apparatus as claim in claim 7 wherein the dummy horse and the ball-receiving surface are driven by the same means.

10. A polo training apparatus as claimed in claim 9, wherein the dummy horse and the ball-receiving surface are driven by a common electric motor.

11. A polo training apparatus as claimed in claim 1 wherein the four upwardly inclined surfaces are at oblique angles to the ball receiving surface are at oblique angles to the ball receiving surface.

12. A polo training apparatus as claimed in claim 1, wherein the enclosure comprises a cage or net.

13. A polo training apparatus comprising a dummy horse having a substantially rigid frame and a body portion pivotally mounted on the frame; a means for displacing the body portion both in a reciprocating motion and a pivotal motion pivoting the body portion from side to side; a pivotally mounted neck portion extending from the pivotally mounted body portion and a pivotally mounted head extending from the neck portion the frame surrounded by an enclosure, the enclosure comprising four upwardly inclined walls, a front wall, a back wall and two side walls, the inclined surfaces angled so as to return a hit ball, the enclosure further comprising a cage means positioned above the inclined walls.

14. A polo training apparatus as claimed in claim 13, further comprising biasing means for biasing the body portion towards a central position.

15. A polo training apparatus as claimed in claim 14, wherein the biasing means comprise springs.

16. A polo training apparatus as claimed in claim 13, further comprising one or more sensors adapted to detect pressure from one or more parts of the rider's body.

17. A polo training apparatus as claimed in claim 16, comprising Sensors adapted to detect pressure from one or more of a rider's feet, knees and hand.

18. A polo training apparatus as claimed in claim 16, further comprising display means to indicate the correct posture is assumed for a particular polo shot.

19. A polo training apparatus as claimed in claim 18, wherein the display means comprises a light.

20. A horse riding training apparatus as claimed in claim 13, comprising pressure sensors adapted to respond to pressure from a rider's feet, wherein actuation of the pressure sensors causes an increase in the speed of movement of the body portion.

21. A horse riding training apparatus as claimed in claim 13, further comprising a simulated horse head portion, reins extending from the horse head portion and a control means actuated by movement of the head with the reins.

22. A horse riding training apparatus as claimed in claim 21, wherein movement of head actuates a switch which, when operated, reduces the speed of the body portion.

* * * * *